US007874919B2

(12) United States Patent
Paulsen et al.

(10) Patent No.: US 7,874,919 B2
(45) Date of Patent: Jan. 25, 2011

(54) GAMING SYSTEM AND GAMING METHOD

(75) Inventors: Craig A. Paulsen, Reno, NV (US); Binh T. Nguyen, Reno, NV (US)

(73) Assignee: IGT, Reno, NV (US)

( * ) Notice: Subject to any disclaimer, the term of this patent is extended or adjusted under 35 U.S.C. 154(b) by 505 days.

(21) Appl. No.: 10/972,830

(22) Filed: Oct. 25, 2004

(65) Prior Publication Data

US 2005/0059485 A1 Mar. 17, 2005

Related U.S. Application Data

(63) Continuation of application No. 10/062,002, filed on Feb. 1, 2002, now abandoned.

(51) Int. Cl.
*A63F 9/24* (2006.01)
*A63F 13/00* (2006.01)

(52) U.S. Cl. ............................ 463/39; 463/36; 463/40; 463/42; 463/43

(58) Field of Classification Search ..................... 463/1, 463/23–25, 29, 40–43, 36, 39; 701/300, 701/213, 216, 225; 342/27, 118
See application file for complete search history.

(56) References Cited

U.S. PATENT DOCUMENTS 4,906,853 A 3/1990 Linwood et al.
5,017,794 A 5/1991 Linwood et al.
5,027,314 A 6/1991 Linwood et al.

(Continued)

FOREIGN PATENT DOCUMENTS

AU 785253 8/2003

(Continued)

OTHER PUBLICATIONS

Search Report (counterpart GB application).

(Continued)

*Primary Examiner*—John M Hotaling, II
*Assistant Examiner*—Steven J. Hylinski
(74) *Attorney, Agent, or Firm*—Weaver Austin Villeneuve & Sampson LLP

(57) ABSTRACT

A method of operating a gaming system comprising a plurality of gaming apparatuses may include receiving position data relating to a position of a player from a wireless device carried by the player. The method may include retrieving stored player data that relates to the player. The method may also include displaying a first video image relating to a video game and determining a payout based on an outcome of the video game, the first video image and the payout not being based on the player data. Additionally, the method may include providing according to the player position data a personalized operation based on the player data. The personalized operation may be selected from the group of personalized operations consisting of displaying a second video images relating to a video game, displaying a third video image unrelated to a video game, and providing a payout independent of the outcome of a video game. A system including a gaming apparatus and a computer is programmed to operate the gaming apparatus according to the method may be provided, as may a gaming apparatus having a controller that is programmed to operate the gaming apparatus according to the method.

49 Claims, 14 Drawing Sheets

U.S. PATENT DOCUMENTS

| | | | | |
|---|---|---|---|---|
| 5,119,104 | A | 6/1992 | Heller | |
| 5,276,496 | A | 1/1994 | Heller et al. | |
| 5,326,104 | A | 7/1994 | Pease et al. | |
| 5,355,222 | A | 10/1994 | Heller et al. | |
| 5,387,993 | A | 2/1995 | Heller et al. | |
| 5,526,357 | A | 6/1996 | Jandrell | |
| 5,548,637 | A | 8/1996 | Heller et al. | |
| 5,572,195 | A | 11/1996 | Heller et al. | |
| 5,586,936 | A | 12/1996 | Bennett et al. | |
| 5,752,880 | A * | 5/1998 | Gabai et al. | 463/1 |
| 5,752,882 | A | 5/1998 | Acres et al. | |
| 5,766,076 | A | 6/1998 | Pease et al. | |
| 5,822,737 | A * | 10/1998 | Ogram | 705/26 |
| 5,899,980 | A * | 5/1999 | Wilf et al. | 705/26 |
| 5,903,878 | A * | 5/1999 | Talati et al. | 705/26 |
| 5,909,492 | A * | 6/1999 | Payne et al. | 705/78 |
| 5,933,498 | A * | 8/1999 | Schneck et al. | 705/54 |
| 6,022,273 | A * | 2/2000 | Gabai et al. | 463/39 |
| 6,026,304 | A | 2/2000 | Hilsenrath et al. | |
| 6,064,339 | A | 5/2000 | Wax et al. | |
| 6,084,546 | A | 7/2000 | Wax et al. | |
| 6,093,103 | A | 7/2000 | McCrea, Jr. | |
| 6,101,390 | A | 8/2000 | Jayaraman et al. | |
| 6,104,295 | A | 8/2000 | Gaisser et al. | |
| 6,104,344 | A | 8/2000 | Wax et al. | |
| 6,104,815 | A | 8/2000 | Alcorn et al. | |
| 6,108,557 | A | 8/2000 | Wax et al. | |
| 6,110,041 | A | 8/2000 | Walker et al. | |
| 6,112,095 | A | 8/2000 | Wax et al. | |
| 6,117,011 | A | 9/2000 | Lvov | |
| 6,142,872 | A | 11/2000 | Walker et al. | |
| 6,150,921 | A | 11/2000 | Werb et al. | |
| 6,154,139 | A | 11/2000 | Heller | |
| 6,160,986 | A * | 12/2000 | Gabai et al. | 434/308 |
| 6,183,362 | B1 * | 2/2001 | Boushy | 463/25 |
| 6,217,448 | B1 | 4/2001 | Olsen | |
| 6,231,445 | B1 | 5/2001 | Acres | |
| 6,232,918 | B1 | 5/2001 | Wax et al. | |
| 6,244,957 | B1 | 6/2001 | Walker et al. | |
| 6,246,376 | B1 * | 6/2001 | Bork et al. | 343/760 |
| 6,249,680 | B1 | 6/2001 | Wax et al. | |
| 6,254,484 | B1 | 7/2001 | McCrea, Jr. | |
| 6,290,566 | B1 * | 9/2001 | Gabai et al. | 446/175 |
| 6,293,866 | B1 | 9/2001 | Walker et al. | |
| 6,319,127 | B1 | 11/2001 | Walker et al. | |
| 6,350,199 | B1 | 2/2002 | Williams et al. | |
| 6,352,478 | B1 * | 3/2002 | Gabai et al. | 463/42 |
| 6,364,765 | B1 | 4/2002 | Walker et al. | |
| 6,567,661 | B2 * | 5/2003 | McDonnell et al. | 455/426.1 |
| 6,569,011 | B1 | 5/2003 | Lynch et al. | |
| 6,631,271 | B1 * | 10/2003 | Logan | 455/456.1 |
| 6,636,175 | B2 * | 10/2003 | Russell et al. | 342/357.1 |
| 6,682,421 | B1 * | 1/2004 | Rowe et al. | 463/25 |
| 6,712,698 | B2 * | 3/2004 | Paulsen et al. | 463/30 |
| 6,722,985 | B2 * | 4/2004 | Criss-Puszkiewicz et al. | 463/29 |
| 6,729,956 | B2 * | 5/2004 | Wolf et al. | 463/25 |
| 6,760,046 | B2 * | 7/2004 | I'Anson et al. | 715/746 |
| 6,773,344 | B1 * | 8/2004 | Gabai et al. | 463/1 |
| 6,778,820 | B2 | 8/2004 | Tendler | |
| 6,799,032 | B2 * | 9/2004 | McDonnell et al. | 455/410 |
| 6,813,499 | B2 * | 11/2004 | McDonnell et al. | 455/456.1 |
| 6,843,725 | B2 * | 1/2005 | Nelson | 463/40 |
| 6,846,238 | B2 * | 1/2005 | Wells | 463/39 |
| 6,887,157 | B2 | 5/2005 | LeMay et al. | |
| 6,902,484 | B2 * | 6/2005 | Idaka | 463/43 |
| 6,912,507 | B1 * | 6/2005 | Phillips et al. | 705/26 |
| 6,935,949 | B1 | 8/2005 | Murphy | |
| 7,112,138 | B2 * | 9/2006 | Hedrick et al. | 463/29 |
| 7,169,052 | B2 | 1/2007 | Beaulieu et al. | |
| RE39,644 | E * | 5/2007 | Alcorn et al. | 380/251 |
| 7,316,619 | B2 | 1/2008 | Nelson | |
| 7,682,249 | B2 * | 3/2010 | Winans et al. | 463/31 |
| 2001/0029202 | A1 | 10/2001 | Kondo et al. | |
| 2001/0055991 | A1 | 12/2001 | Hightower | |
| 2002/0039919 | A1 | 4/2002 | Joshi et al. | |
| 2002/0042296 | A1 * | 4/2002 | Walker et al. | 463/23 |
| 2002/0058543 | A1 | 5/2002 | Walker et al. | |
| 2002/0077177 | A1 * | 6/2002 | Elliott | 463/40 |
| 2002/0085588 | A1 * | 7/2002 | Giaccherini et al. | 370/487 |
| 2002/0142846 | A1 * | 10/2002 | Paulsen | 463/43 |
| 2002/0143639 | A1 | 10/2002 | Beckett et al. | |
| 2002/0152120 | A1 | 10/2002 | Howington | |
| 2002/0173354 | A1 * | 11/2002 | Winans et al. | 463/20 |
| 2002/0196342 | A1 * | 12/2002 | Walker et al. | 348/157 |
| 2002/0198044 | A1 * | 12/2002 | Walker et al. | 463/25 |
| 2003/0003997 | A1 | 1/2003 | Vuong et al. | |
| 2003/0032486 | A1 * | 2/2003 | Elliott | 463/43 |
| 2003/0036428 | A1 * | 2/2003 | Aasland | 463/29 |
| 2003/0038805 | A1 | 2/2003 | Wong et al. | |
| 2003/0045354 | A1 | 3/2003 | Giobbi | |
| 2003/0050806 | A1 * | 3/2003 | Friesen et al. | 705/5 |
| 2003/0073496 | A1 | 4/2003 | D'Amico et al. | |
| 2003/0078101 | A1 * | 4/2003 | Schneider et al. | 463/42 |
| 2003/0120492 | A1 | 6/2003 | Kim et al. | |
| 2003/0148808 | A1 | 8/2003 | Price | |
| 2003/0148809 | A1 | 8/2003 | Nelson | |
| 2003/0148812 | A1 | 8/2003 | Paulsen et al. | |
| 2004/0023709 | A1 * | 2/2004 | Beaulieu et al. | 463/16 |
| 2004/0132530 | A1 | 7/2004 | Rutanen et al. | |
| 2004/0162129 | A1 | 8/2004 | Nelson | |
| 2005/0043072 | A1 * | 2/2005 | Nelson | 463/1 |
| 2005/0064926 | A1 * | 3/2005 | Walker et al. | 463/16 |
| 2006/0073884 | A1 * | 4/2006 | Walker et al. | 463/25 |
| 2006/0148551 | A1 * | 7/2006 | Walker et al. | 463/16 |
| 2006/0177109 | A1 * | 8/2006 | Storch | 382/118 |
| 2006/0208868 | A1 * | 9/2006 | Walker et al. | 340/500 |
| 2006/0208869 | A1 * | 9/2006 | Walker et al. | 340/500 |
| 2006/0223628 | A1 * | 10/2006 | Walker et al. | 463/20 |
| 2006/0247016 | A1 * | 11/2006 | Walker et al. | 463/20 |
| 2006/0252534 | A1 * | 11/2006 | Walker et al. | 463/31 |
| 2007/0087841 | A1 | 4/2007 | Beaulieu et al. | |
| 2007/0099697 | A1 | 5/2007 | Nelson | |
| 2008/0009340 | A1 * | 1/2008 | Walker et al. | 463/25 |
| 2008/0009341 | A1 * | 1/2008 | Walker et al. | 463/25 |
| 2008/0051198 | A1 | 2/2008 | Nelson | |
| 2008/0076570 | A1 * | 3/2008 | Johnson | 463/42 |
| 2008/0274808 | A1 * | 11/2008 | Walker et al. | 463/31 |
| 2009/0042633 | A1 * | 2/2009 | Yacenda | 463/17 |

FOREIGN PATENT DOCUMENTS

| | | |
|---|---|---|
| AU | 2003200397 | 8/2003 |
| AU | 2003256490 | 2/2004 |
| DE | 10393026 T5 | 8/2005 |
| EP | 0992265 | 4/2000 |
| EP | 1 197 251 | 4/2002 |
| EP | 1 291 830 | 3/2003 |
| GB | 2385003 | 10/2005 |
| GB | 2406526 | 10/2006 |
| GB | 2385280 | 12/2006 |
| GB | 2423033 | 12/2006 |
| WO | 9830297 | 7/1998 |
| WO | 0148713 | 7/2001 |
| WO | 0154091 | 7/2001 |
| WO | 0174464 | 10/2001 |
| WO | 01/99067 | 12/2001 |
| WO | 02/17251 | 2/2002 |
| WO | 0232517 | 4/2002 |
| WO | WO 02/077935 | 10/2002 |
| WO | 02103586 | 12/2002 |
| WO | 03005743 | 1/2003 |
| WO | 03/015042 | 2/2003 |
| WO | 03/025828 | 3/2003 |
| WO | WO 03/060846 | 7/2003 |

WO 2004/012833 2/2004

OTHER PUBLICATIONS

UK Search and Examination Report dated Jun. 13, 2006 from corresponding GB Application No. GB0609584.8 (5 pages).
Office Action from U.S. Appl. No. 10/062,002, Apr. 23, 2004, 15 pages.
Office Action from U.S. Appl. No. 10/212,598, Mar. 20, 2006, 7 pages.
Notice of Allowance dated Sep. 19, 2006 from U.S. Appl. No. 10/212,598.
International Search Report from PCT Application No. 2003021685 dated Oct. 13, 2003, 3 pages.
Examination Report in Australian Patent Application No. 2003256490 dated Mar. 6, 2006.
Versus Technology, Inc., Eagle Eye/Eagle Eye Network; "Turn your access control system into a real-time asset tracking system," printed: Aug. 2001; pp. 1-8; website: www.versustech.com/eagleeye.html.
SpaceDaily; "PinPoint Asset Management Via GPS," published: Oct. 1998; pp. 1-5; website: www.spacer.com/news/gps-98m.html.
Office Action from U.S. Appl. No. 10/954,603, dated Feb. 8, 2007, 6 pages.
Final Office Action from U.S. Appl. No. 10/954,603, Jul. 26, 2007, 7 pages.
Notice of Allowance and Notice of Allowability from U.S. Appl. No. 10/954,603, Oct. 5, 2007, 6 pages.
Examination Report from Australian application No. 2006202033, dated Jan. 4, 2008, 7 pages.
Office Action from U.S. Appl. No. 11/564,231, Mar. 20, 2009.
Office Action from U.S. Appl. No. 11/639,465, Jun. 24, 2009.
Office Action dated Aug. 25, 2009 from U.S. Appl. No. 11/564,231 dated.
Final Office Action from U.S. Appl. No. 11/639,465, Feb. 3, 2010.
Notice of Allowance from U.S. Appl. No. 10/072,277 dated Jun. 23, 2004.
Pre-Brief Appeal Conference Decision from U.S. Appl. No. 11/564,231 Jan. 13, 2010.
Examination Report from Australian Application No. 2003200397, dated May 20, 2005, 3 pages.
Examination Report from Australian Application No. 2006202033, dated Oct. 24, 2006, 2 pages.
Examination Report from Australian Application No. 2008203314, dated Mar. 22, 2010, 1 page.
Search Report from Foreign Application No. GB0302688.7 dated Jun. 9, 2003, 3 pages.
Examination Report from Foreign Application No. GB0302688.7 dated Feb. 8, 2005, 3 pages.
Examination Report from Foreign Application No. GB0502534.1, Jun. 17, 2005, 4 pages.
Examination Report from Foreign Application No. AU29241/02 dated Sep. 12, 2005.
Search Report from Foreign Application No. GB0302331.4, Jun. 16, 2003, 3 pages.
Anick Jesdanun, "Personal Wireless Internet Tracking Devices Coming Soon," 1 page.
Christine Blank, "1000 Redeem Wireless Coupons During CompUSA Experiment," Apr. 9, 2001, 1 page.
"Locating People," Versus Technology, Inc., Jul. 26, 2001, 2 pages.
"Pinpoint Asset Management Via GPS," Oct. 6, 1998, 4 pages.
GPS Personal Locator (2002), 2 pages.

* cited by examiner

FIG. 11
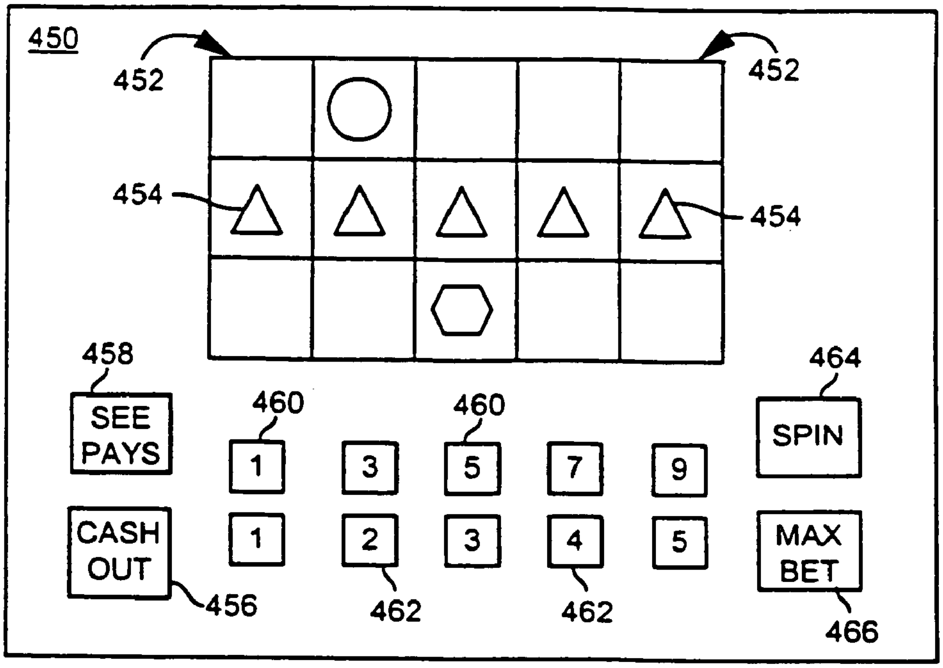
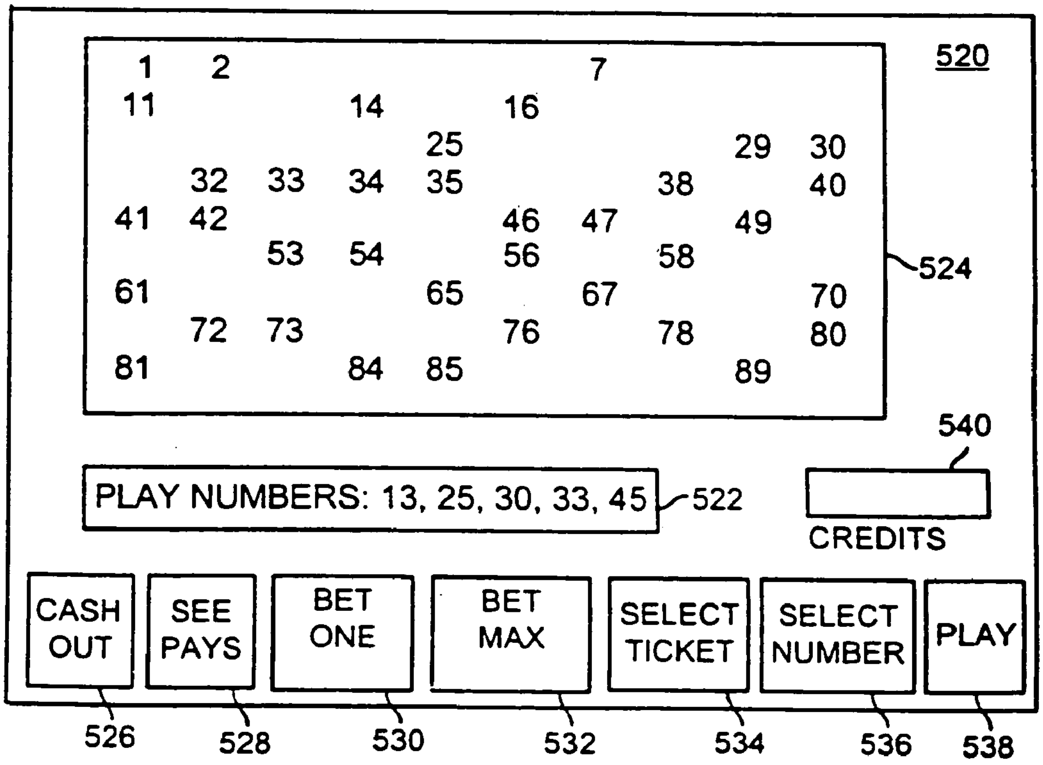
FIG. 12

GAMING SYSTEM AND GAMING METHOD

BACKGROUND

The invention is directed to a gaming apparatus and a method of gaming, and in particular to a personalized gaming apparatus and a method of personalized gaming.

U.S. Pat. No. 6,150,921 states that data about the characteristics of a signal transmitted by a transmitter and received, by a receiver may be used to determine the distance between the transmitter and the receiver. After determining the distance between the transmitter and multiple receivers, the set of distances thus determined can be combined, using triangulation techniques for example, to determine the position of the transmitter relative to the receivers.

U.S. Pat. No. 6,249,680 states that data about the characteristics of a signal received from a transmitter transmitting at a particular position may be used to define a pattern for that position. By repeating the process for multiple positions, a database of patterns and positions may be generated. Subsequently, when a receiver receives a signal from a transmitter, the characteristics of the signal are analyzed to determine the pattern for that signal. The pattern is then compared against the database of patterns to determine position of the transmitter.

U.S. Pat. No. 6,104,815 states that the Global Positioning Satellite (GPS) system may be used to determine the location of a terminal connected to the Internet for purposes of determining if the terminal is in a jurisdiction which permits online gaming. It is stated that transmission of the GPS data over the Internet would permit the party providing the on-line gaming service to verify that persons using the on-line gaming service are legally permitted to do so based on the laws applicable where the data indicates the terminal is located.

SUMMARY

A method of operating a gaming system comprising a plurality of gaming apparatuses may include receiving position data relating to a position of a player from a wireless device carried by the player. The method may include retrieving stored player data that relates to the player. The method may also include displaying a first video image relating to a video game and determining a payout based on an outcome of the video game, the first video image and the payout not being based on the player data. Additionally, the method may include providing according to the player position data a personalized operation based on the player data. The personalized operation may be selected from the group of personalized operations consisting of displaying a second video images relating to a video game, displaying a third video image unrelated to a video game, and providing a payout independent of the outcome of a video game.

BRIEF DESCRIPTION OF THE DRAWINGS

FIG. 11 is an illustration of an embodiment of a visual display that may be displayed during performance of the slots routine of FIG. 13:

FIG. 12 is an illustration of an embodiment of a visual display that may be displayed during performance of the video keno routine of FIG. 14:

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '——————' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. §112, sixth paragraph.

Figure 1:
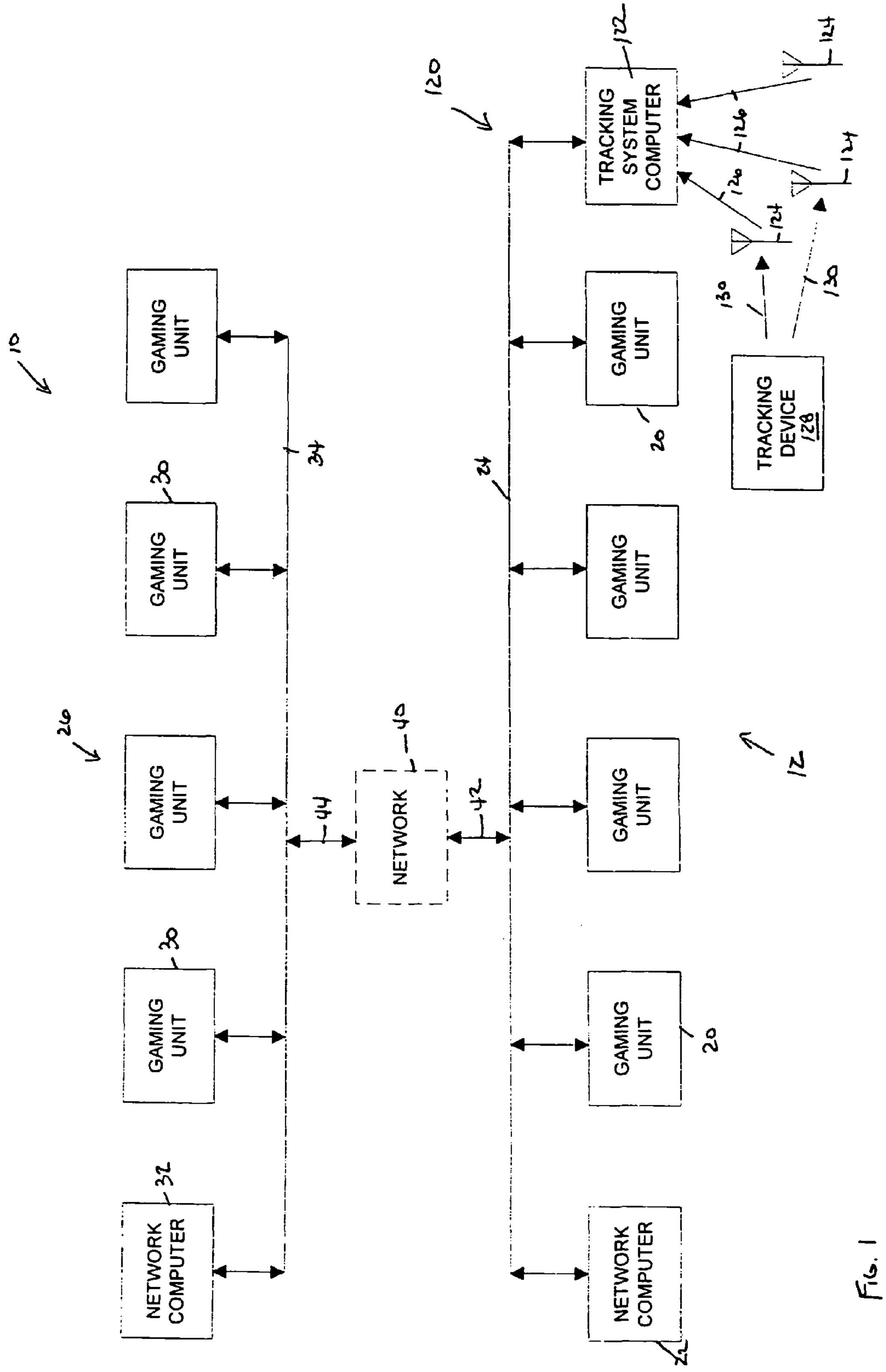
FIG. 1 is a block diagram of an embodiment of a gaming system in accordance with the invention.

FIG. 1 illustrates one possible embodiment of a casino gaming system 10. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server. computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links. As another alternative, a peer-to-peer network may be used, in which case there would be no need for the network computers 22, 32 because the casino gaming units 20, 30 would instead share the processing handled by the network computers 22, 32 in the casino gaming system 10 as illustrated.

Gaming Unit

Figure 2:
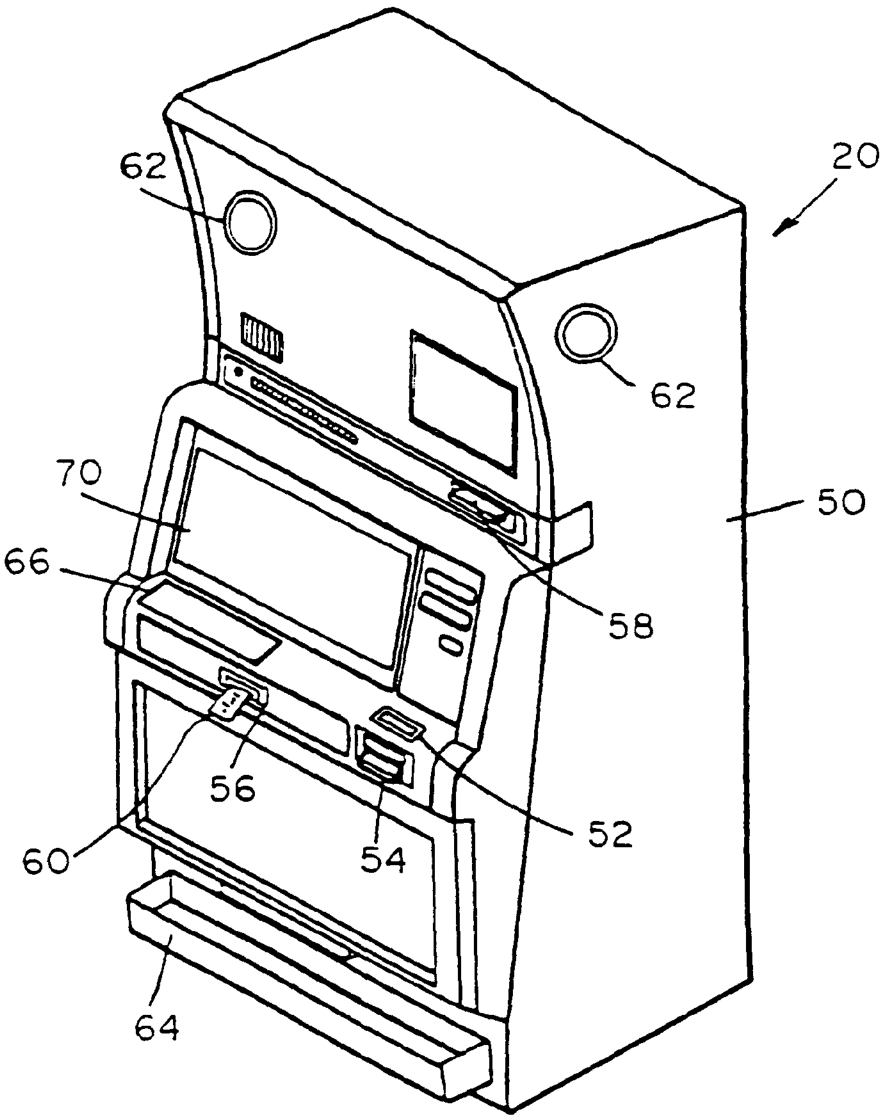
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term “value” may encompass money denominations or credits, and may be in the form of gaming tokens, coins, paper currency, ticket vouchers, electronic vouchers (stored, for example, on a card or PDA (Personal Digital Assistant)), credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player’s gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer’s voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
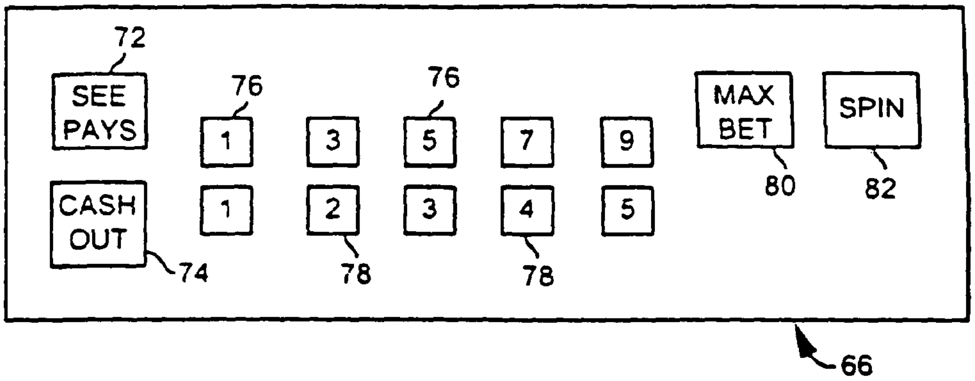
FIG. 2A illustrates an embodiment of a control panel for a gaming unit.

FIG. 2A illustrates one possible embodiment of the control panel 66, which may be used where the gaming unit 20 is a slot machine having a plurality of mechanical or “virtual” reels. Referring to FIG. 2A, the control panel 66 may include a “See Pays” button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that the rectangle simply designates, for ease of reference. an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
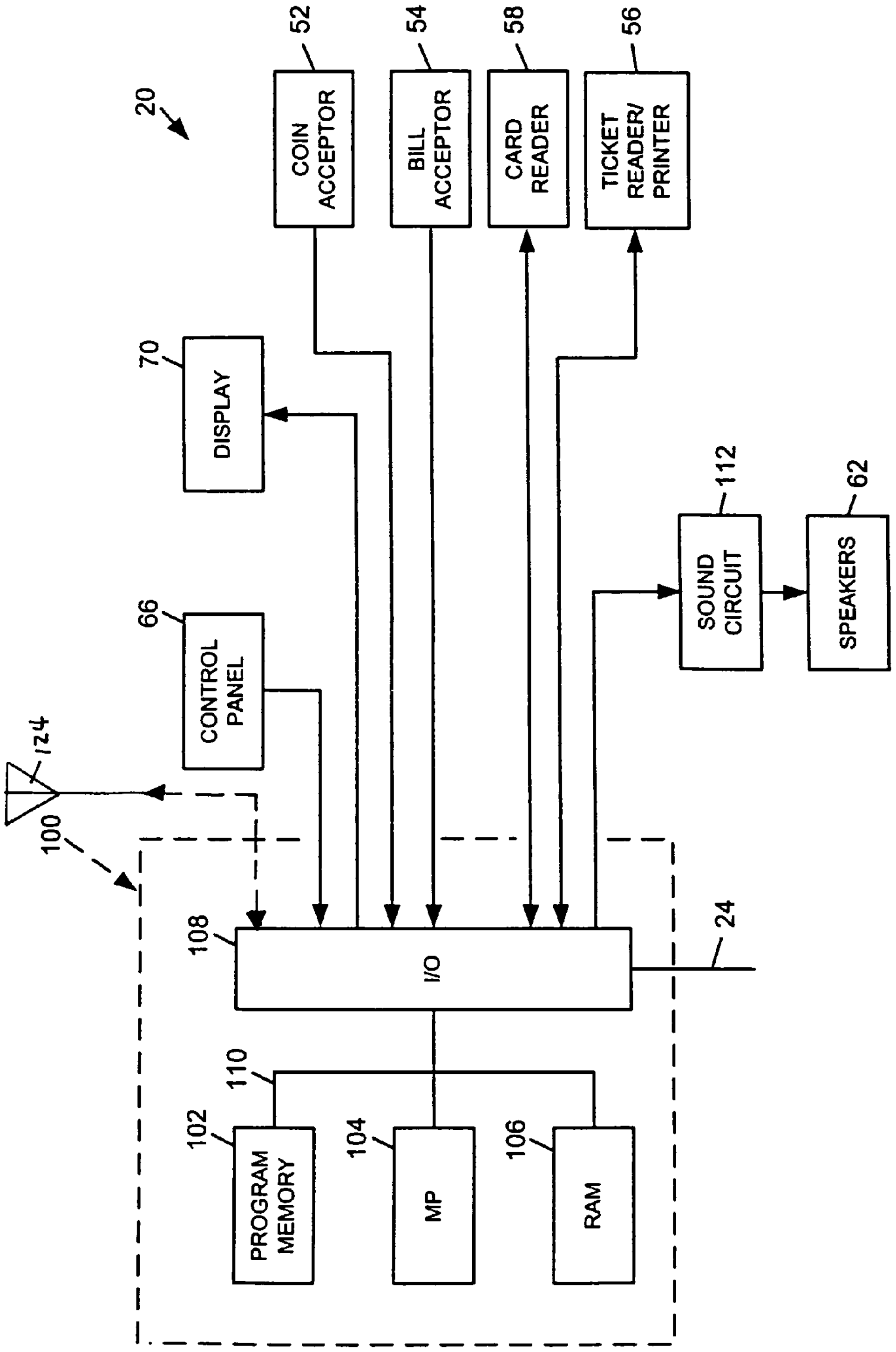
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Returning to FIG. 1, the network 12 may include a tracking system 120. The system 120 may include a tracking system computer 122 which may be in communication with the casino gaming units 20 and the network computer 22 via the data link or bus 24. Alternatively, the network computer 22 may be used as the tracking system computer 122, or the tracking system computer may be in communication with the network 12 via the network 40. The tracking system 120 may include a plurality of antennas 124 coupled to the central computer 122 via links 126, which links 126 may be hard-wired or wireless. As an alternative, one or more of the antennas 124 may be optionally associated with a gaming unit 20, 30 and connected to the I/O circuit 108, as shown in FIG. 3. The tracking system 120 may also include a personal tracking device 128 which may be in communication with the antennas 124 over a wireless (radio frequency (RF) or infrared (IR)) connection 130. The personal tracking device 128 may be a cell phone or a pager, for example. The personal tracking device 128 may also be Personal Digital Assistant (PDA), RF identification tag, or the like.

Personalization Routine

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++, C# or the like or any low-level, assembly or machine language. By storing the computer program portions therein, various portions of the memories 102, 106 are physically and/or structurally configured in accordance with computer program instructions.

Figure 4:
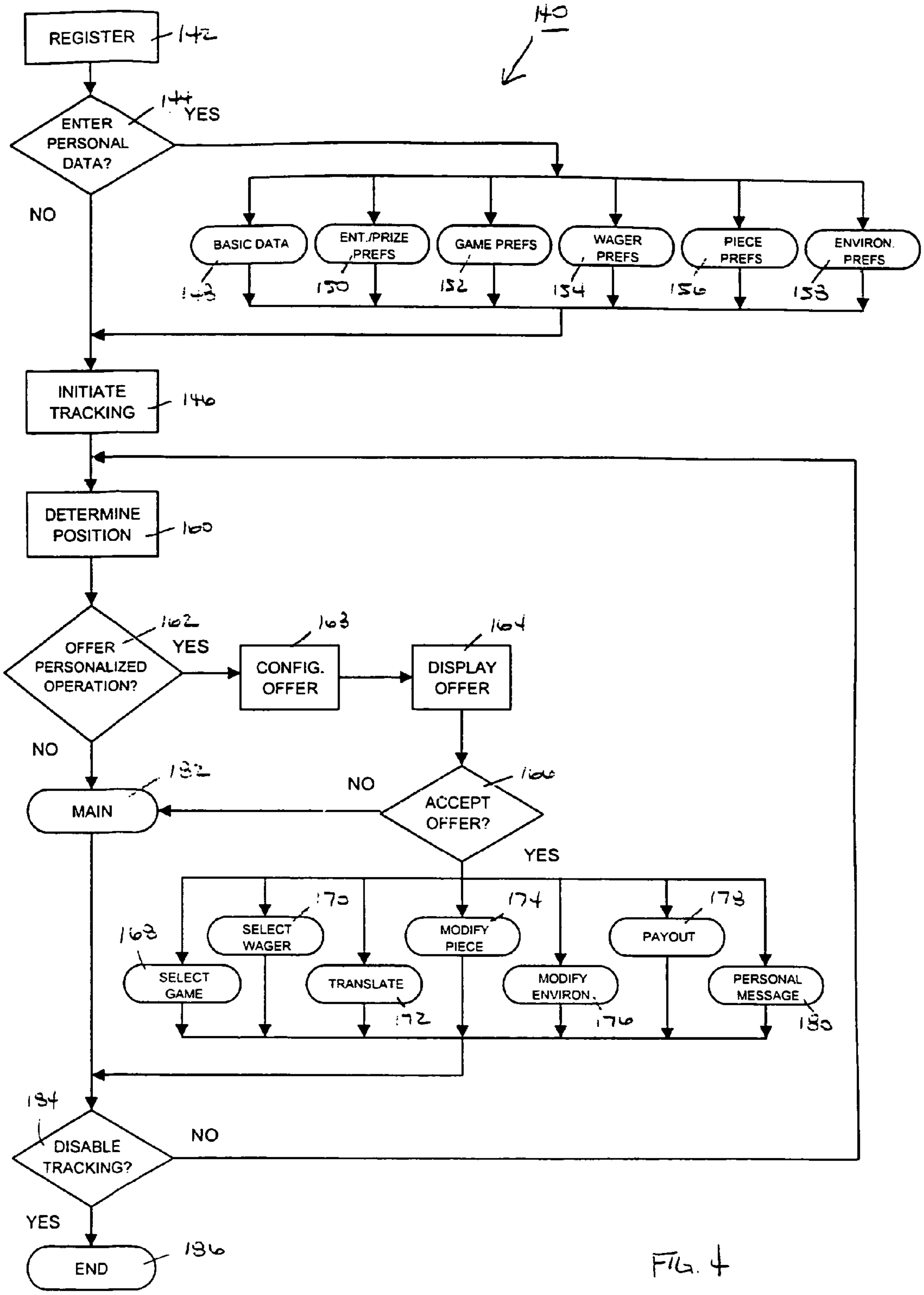
FIG. 4 is a flowchart of a gaming unit personalization routine in accordance with the invention that may be performed during operation of the gaming system of FIG. 1.

FIG. 4 is a flowchart of a gaming unit personalization routine 140 that may be stored in the memory of the network computer 22. Referring to FIG. 4, the personalization routine 140 may begin operation at block 142 with registration of the personal tracking device 128. During registration, the network computer 22 may be taught or may learn the relationship between the personal tracking device 128 and an identifier, as described below.

There are many different methods by which the network computer 22 may learn or be taught the relationship between the device 128 and the identifier assigned to that device 128. For example, where the gaming system operator is also the party that maintains the tracking system 120 and provides the personal tracking devices 128 to the players, an association between an identifier and a personal tracking device 128 may be programmed into the system 10 before the personal tracking device 128 is provided to the player. In such a case, when the personal tracking device 128 is activated, the system 10 will be able to associate an identifier with the personal tracking device 128 without additional action by an employee of the gaming system operator or the player. Where the gaming system operator does not provide the personal tracking devices 128 to the players, for example where the personal tracking device 128 is a cell phone or a pager, an association between the personal tracking device 128 and an identifier in the network computer 22 may be created. In such a case, the phone number of the cellular phone/personal tracking device 128 may be used as the identifier and may be programmed into the system 10 by a variety of methods.

For example, an employee of the gaming system operator may register players at a specific location set up for this purpose (e.g. at the concierge desk), or may "roam" the floor to perform this service wherever the player is located. Alternatively, the player may register him or herself over the Internet before entering the casino, at a kiosk established for registration at the casino, or at gaming units adapted to permit registration to occur.

The identifier may be unique to each personal tracking device 128, like a cell phone number, or may be unique for a group of personal tracking devices 128. That is, where the gaming system operator intends to distribute the personal tracking devices 128 to members of a tour group, for example, the desired goal may not be for the gaming units 20, 30 to respond differently to each member of the tour group, but rather for the gaming and display units 20, 30 to respond to members of the tour group differently than to the general public. As another example, the gaming system operator may wish to target certain groups or categories of player, e.g., "high-rollers," to receive bonuses not available to the general public, but available to all the members of the target group. Consequently, the members of the target group would receive personal tracking devices 128 with an identifier which differentiates the members of the group from the public-at-large and all other players carrying personal tracking devices 128. In this regard, some of the personal tracking devices 128 may develop recognition as a status symbol item as well as performing a practical function.

Moreover, more than one identifier may be assigned to one personal tracking device 128. For example, a particular personal tracking device 128 may be associated with a first identifier which indicates that the associated player belongs to a first group, e.g., the "high-roller" group, and with a second identifier which indicates that the associated player belongs to a second group, e.g., the "ultra high-roller" group, which may or may not be exclusive of the first group. Moreover, the second identifier may be unique relative to all other identifiers, such that the associated player may be differentiated from all other players using personal tracking devices 128.

After registration at block 142, the system 10 may request at block 144 that the player provide personal data to be stored in one or more records that will be associated with the player's identifier (or identifiers). This may occur wherever registration was performed (e.g. over the Internet, at the concierge desk, at the gaming unit, with a roaming courtesy clerk, etc.). If the player has recently updated this information, the routine may proceed to block 146. Otherwise, the routine may proceed to blocks 148, 150, 152, 154, 156, 158.

As stated above, each identifier may be associated with one or more records, for example stored in the network computer 22, that may contain data about the position, habits and/or preferences of a player associated with the identifier. For instance, the system 10 may generate and maintain a position record in which data about the position of the player at any given time and over time is stored. This position record may be created and maintained by the network computer 22 by receiving position data relating to the position of the player from the tracking system computer 122 that is in communication with the personal tracking device 128 via the antennas 124. The system 10 may also generate and maintain a bonus record including a running total of the value wagered by the player and bonuses awarded therefore.

Other records may be created manually or by the system 10 and/or updated manually or by the system 10, as represented by blocks 148, 150, 152, 154, 156, 158. For example, at block 148 the player may enter basic personal data that will be stored in a personal data record. The personal data record may include such data as the name, address, nationality, language skills, and cultural preferences of the player. The personal data record may also contain important dates, such as birthdays, anniversaries, and other occasions. At block 150, the player may enter data regarding his or her favorite foods, shows, prizes, complementaries ("comps"), and the like in to the system 10, and/or the network computer 22 may generate some of this data by analyzing the movements of the player to restaurants, theaters, etc. This data is then stored in an entertainment record.

Either the player may enter or the system 10 may generate (through the analysis of data gathered and maintained by the network computer 22) data about the player's gaming preferences (e.g., favorite casino games) to be stored in a gaming record at block 152. Similarly, either the player may enter or the system may generate (through data analysis) data about the player's wagering preferences to be stored in a wagering record at block 154. This data may include whether the player prefers to always bet the maximum, to always bet the maximum on certain games, to always bet a certain amount on certain value games, etc.

At blocks 156, 158, the player may enter his or her preferences regarding the look of the display. For example, at block 156, the player may change the appearance of the game piece images. For example, the player may enter his or her preference to have the game piece images enlarged, or the clothes worn by the king, queen and jack changed from one style (Tudor) to another (Ottoman), or the symbols on the slot machine to be animated rather than still. At block 158, the player may indicate his or her preferences as to the game environment (e.g. background). For instance, the default background may be red, and the player may wish to change the background to blue. Alternatively, the player may wish to have a solid color background replaced with an image of a mountain range, lake or the like. This data may be contained in a game piece record and a game environment record, or a single video image record.

Where more than one identifier is associated with one of the personal tracking devices 128, each identifier may be associated with different records. For example, for a device associated with a first identifier which indicates that the associated player is a member of the "high-rollers" group and a second unique identifier, the position, entertainment and bonus records may be associated with the first identifier, while all of the available records may be associated with the second identifier.

The routine 140 may then proceed to block 146, where the system 10 begins tracking the player's position. Thereafter, the position of the player may be determined at a block 160, and the position data may be stored in the position record maintained by the network computer 22.

It will be recognized that the determination the position of the player at the block 160 may be periodically or continuously updated. Where the gaming units 20, 30 are closely spaced, the system 10 may update the position of the player more frequently than when the gaming units 20, 30 are spaced further apart. Moreover, the frequency of the updates may be adjusted according to the position of the player within the area monitored by the tracking system 120. For example, where the tracking system 120 determines that the personal tracking device 128 is located in a restaurant or a theater, or where the position of the personal tracking device 128 has remained constant for several minutes, the system 10 may update the position data less frequently.

A number of methods for determining the position of the player at the block 60 may be used. For example, the personal tracking device 128 may be designed to have a limited range of transmission and each gaming unit 20, 30 may be equipped with a receiving device, such as one of the antennas 124, as shown in FIG. 3. The range of transmission of the personal tracking device 128 and/or the sensitivity of the antenna 124 may be adjusted such that receipt of the transmission by one of the antennas 124 will permit the system 120 to determine the player's position based on the position of the unit 20, 30 associated with the receiving antenna 124 within a margin of error corresponding to the range of transmission/reception. Given data on the position of the receiving unit 20, 30 relative to a frame of reference, the system 120 can then determine the position of the player relative to the frame of reference within the same margin of error. A similar system 120 might utilize antennas 124 which are not associated with only one unit 20, 30, but may be associated with a particular group of units 20, 30.

Alternatively, a distance/triangulation scheme may be used. According to such a scheme, the system 120 may use the characteristics of a signal transmitted from the personal tracking device 128 to one of the antennas 124 to determine the distance between the personal tracking device 128 and that antenna 124. Distances may be determined for several antennas 124, and the distances may be compared using triangulation techniques to determine the position of the personal tracking device 128 relative to the antennas 124. Data about the position of one of the antennas 124 relative to a frame of reference may then be used to translate the position of the personal tracking device 128 relative to the antennas 124 into a position relative to the frame of reference.

As a further alternative, measurements may be made of the signal characteristics (e.g. signal strength) for one of the personal tracking devices 128 transmitting at various positions within a given area (for example, the area of reception for one of the antennas 124). These measurements may be collected and stored in a database. Alternatively, a pattern may be generated based on the measurements taken, and the pattern may be stored in a database. Subsequently, when the system 120 receives a transmission from one of the signal-tracking devices 128, measurements are made of the same signal characteristics. The measurement (or a pattern generated therefrom) is compared against the database of measurements (or patterns) corresponding to transmissions received from known positions within the given area. According to the similarity of the measurement with those stored in the database, the system 120 determines the position of the personal tracking device 128 within the given area. With data about the area relative to a frame of reference, the position of the personal tracking device 128 relative to the frame of reference may be determined.

As another alternative, the personal tracking device 128 may have an on-board device which determines the position of the personal tracking device 128 relative to a fixed or relative frame of reference. For example, the personal tracking device 128 may make use of the Global Positioning Satellite (GPS) system (e.g. the personal tracking device 128 may be similar to the GPS Personal Locator sold by Wherify Wireless Inc. of Redwood Shores, Calif.), an external system put in place to provide enhanced 911 service or a cellular telephone infrastructure (such as that of the Sprint PCS system) to determine the position of the personal tracking device 128. In such a case, the personal tracking device 128 may determine its position using the GPS, the external system or the infrastructure, and then transmit the position data to the network computer 22.

It will be further understood that the tracking system 120 may track the player as he or she passes from location to location in a single casino, or in a group of casinos operated by a single gaming system operator, for example. In the later case, the casinos in the group of casinos may be distributed within a single city or state, or may be distributed across a country or throughout the world.

The network computer 22 may next determine at block 162 whether to offer personalized operation and, if so, at which gaming unit 20, 30 based on the position of the personal tracking device 128 and associated player. For example, the network computer 22 may determine whether to offer personalized operation by accessing the position record associated with a particular identifier and comparing the position data contained within that record with position data stored in the network computer 22 for various of the unattended gaming units 20. For example, in comparing the two records, the computer 22 may calculate the distance between the personal tracking device 128 (and associated player) and one (or more) of the unattended gaming units 20. If the distance between the tracking device and one (or more) of the unattended gaming units 20 is within a certain range, the computer 22 may prompt the unattended gaming unit (or units) 20 to proceed to block 163.

Alternatively, the controllers 100 of the gaming units 20, 30 may access the player position records and make the comparison between the data stored in these player position records and position data contained in a position data record stored within the controller 100. As a further alternative, using a system 120 wherein the personal tracking devices 128 are of limited range and the antennas 124 are associated each with one of the units 20, 30, it may not be necessary to make a comparison, but merely to determine which antenna 124 is receiving the transmission to determine position and proximity. In such a case, the position record, if one is maintained, may merely consist of an identification of which of the antennas 124 is presently receiving transmissions from the personal tracking unit.

If the determination is made at block 162 that personalized operation is to be offered at one (or more) of the gaming units 20, 30, then at block 163, the controller 100 gathers data on the offers that may be made to the identified player, and configures the data into a presentation that may be displayed to the player at block 164. While some personalized operations may be available generally (e.g. translation), other personalized operations may be available only at specific times of the day or year (e.g. holidays) or only to members of specific groups. The presentation may specifically list the personalized operations available, so that the player may select which to receive, or may only indicate that the gaming unit may provide a personalized operation to the player without explaining the details of the personalized operation to be provided.

At block 164, the one of the gaming units 20, 30 provides an indication to the player that the operation of the gaming unit 20, 30 may be personalized according to the records associated with his or her identifier. For example, the controller 100 associated with one of the gaming units 20, 30 may control the display unit 70 to display a video image comprising words and/or graphic items to indicate to a player that the gaming unit 20, 30 is capable of one or more personalized operations. The routine 140 may then proceed to block 166, where a determination may be made if the player wishes to accept personalized operation, for example, by determining whether or not the player depresses one of the buttons 72, 74, 76, 78, 80, 82 or a particular area of a touch screen. The system 10 may also determine that the player does not wish to accept the offer if the player fails to respond to the offer within a specific period of time (e.g. thirty seconds).

If the player indicates his or her desire to accept personalized operation at block 166, the routine 140 may proceed to one or more of blocks 168, 170, 172, 174, 176, 178, 180, wherein personalized operation may be provided. It will be recognized that one, some or all of the personalized operations 168, 170, 172, 174, 176, 178, 180 may be performed in response to the player's acceptance of the offer of personalized operation.

For example, the controller 100 of the gaming unit 20, 30 may retrieve the gaming record, and automatically select a casino game at block 168 for the player from the group of games such as video poker, video blackjack, video slots, video keno, and video bingo according to the gaming record associated with the identifier. Further, the controller 100 may retrieve the wagering record, and automatically select a wager at block 170 for the player according to the wagering record associated with the identifier. Also, the controller 100 may control the display unit 70 to generate a video image wherein words are displayed in a language and/or a character set different from the default language and/or default character set according to data contained in the personal data record at block 172. For example, where words were displayed originally in English, the controller 100 may control the display unit 70 to display the words in another language, such as French, German, Arabic, Chinese, or Japanese, according to the personal data record associated with the identifier. Further, the controller 100 may control the display unit 70 to modify the appearance of the game piece images according to the data in the game piece record at block 174 and/or to modify the game environment according to the data in the game environment record at block 176.

As still further possibilities, the controller 100 may provide a value payout at block 178 according to the bonus record associated with the identifier. For example, the controller 100 may control the printer 56 to generate a food and drink voucher if the player is proximate to a restaurant. Similarly, the controller 100 may control the printer 56 to generate a show ticket if the player is proximate to a theater. Also, the controller 100 may generate a coupon or ticket for use (e.g., redeemable for free credit, a jackpot multiplier, etc.) at a gaming unit at another location, thereby stimulating movement of the player to an idle area of the casino, for example. This payout may be made independent a determination of a game outcome; i.e., it may not be a prerequisite that the player use the gaming unit 20, 30 to play a game before the value payout is made.

As yet another possibility, the controller 100 may control the display unit 70 to generate a video image at block 180 including words and graphics to convey a personalized greeting according to the personal data record associated with the identifier. The controller 100 may also control the sound circuit 112 to add sound to the presentation.

In this regard, the personalized greeting may be a birthday greeting, a wedding greeting, and/or an anniversary greeting. Other greetings, such as a "welcome back" greeting may be included, as may informative greetings that direct the player to his or her favorite game, theater, or restaurant and that may include an on-screen or printed map of the casino to direct the player. Such a possibility would be particularly well-suited for the form of the system 10 wherein the player-specific tracking units 128 are provided to a group of players and the identifiers associated with the player-specific tracking units 128 do not differentiate between the individual members of the group. That is, the system 10 could be used to direct all the members of the group to a location, like a restaurant or theater, using messages appearing on the closest gaming units 20, 30. Again, this operation may be provided independent of a determination of a game outcome.

If the player indicates that he or she does not wish to accept personalized operation at block 166 or if it is determined at block 162 that an offer of personalized operation will not be made, the operation of the gaming units 20, 30 may follow that of a main routine 182 explained in greater detail below. The routine may then proceed to block 184 where a determination is made as to whether the player wishes to disable tracking and regain his or her anonymity. The player may disable tracking by returning the personal tracking device 128 to the point of registration. Alternatively, where the personal tracking device 128 is the property of the player, and not the gaming system operator, the tracking may be disabled, for example, by turning the personal tracking device 128, such as a cell phone, off. If the player does not wish to disable the tracking, then the routine 140 may return to block 160. Otherwise, the routine may end at block 186.

Main Routine

Figure 5:
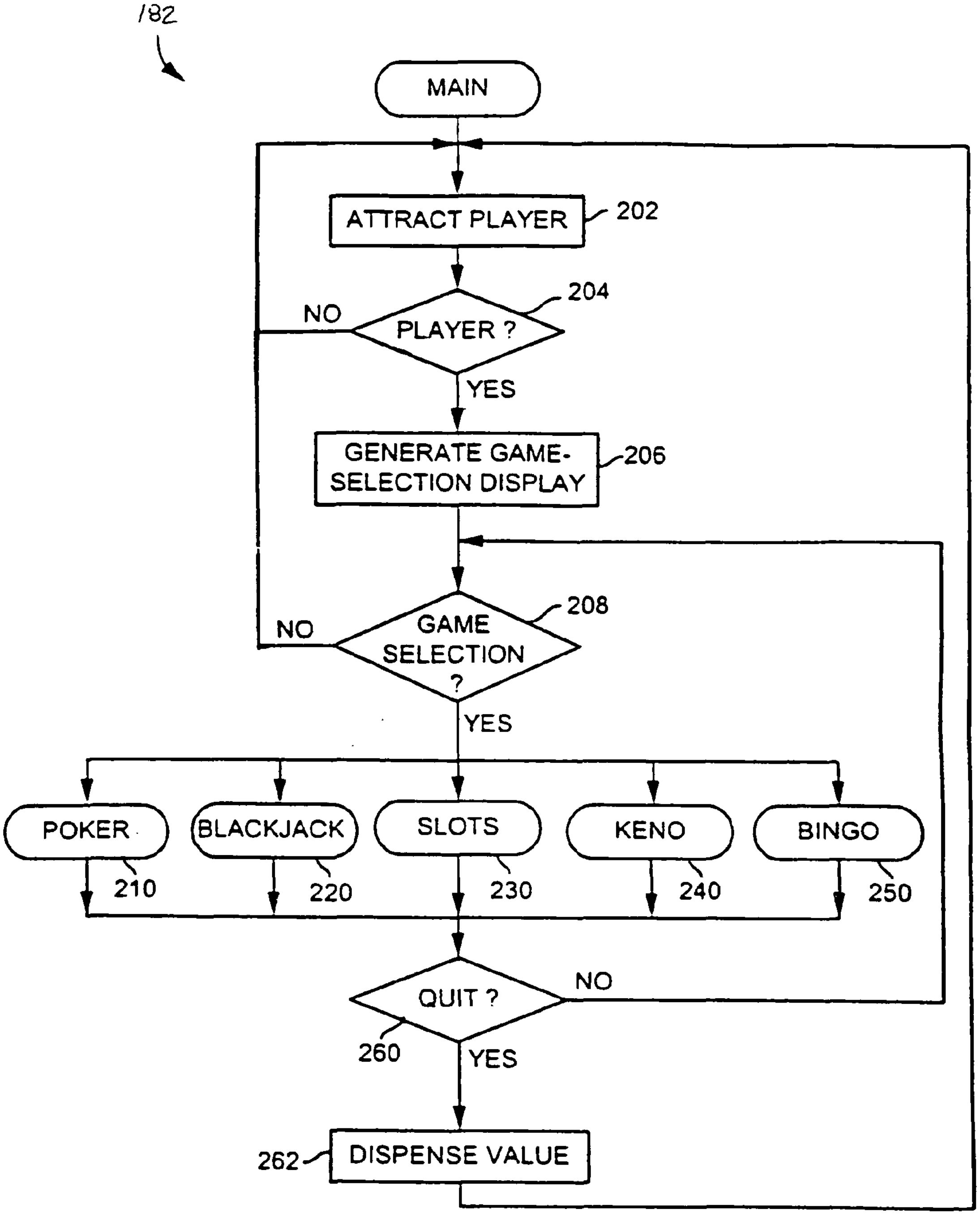
FIG. 5 is a flowchart of an embodiment of a main routine that may be performed during operation of one or more of the gaming units.

FIG. 5 is a flowchart of the main operating routine 182 shown schematically in FIG. 4, which routine 182 may be stored in the memory of the controller 100. Referring to FIG. 5, the main routine 182 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo. etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 5, a different number of routines could be included to allow play of a different number of games. The gaming unit 20 may also be programmed to allow play of different games.

Figure 6:
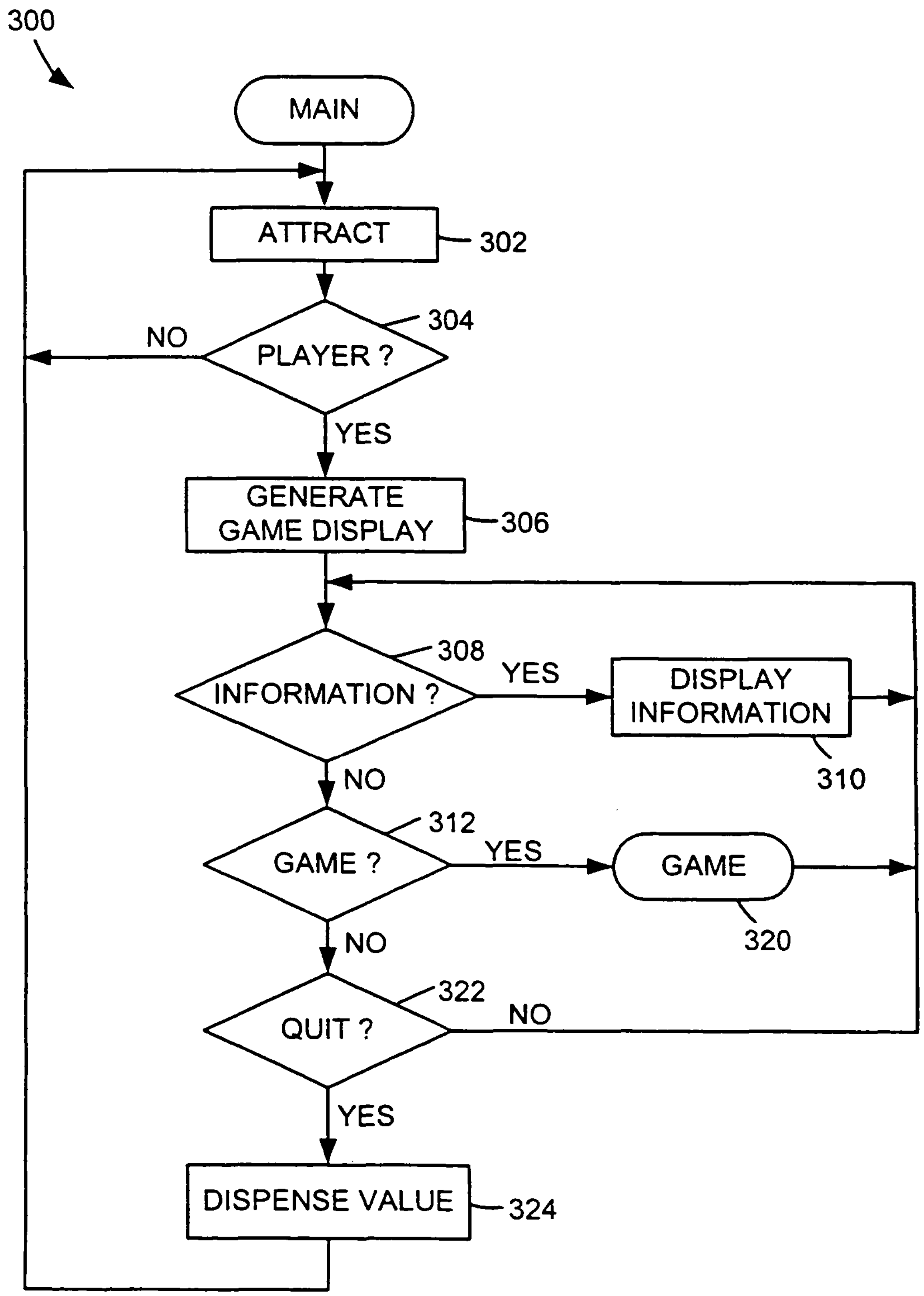
FIG. 6 is a flowchart of an alternative embodiment of a main routine that may be performed during operation of one or more of the gaming units.

FIG. 6 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 7:
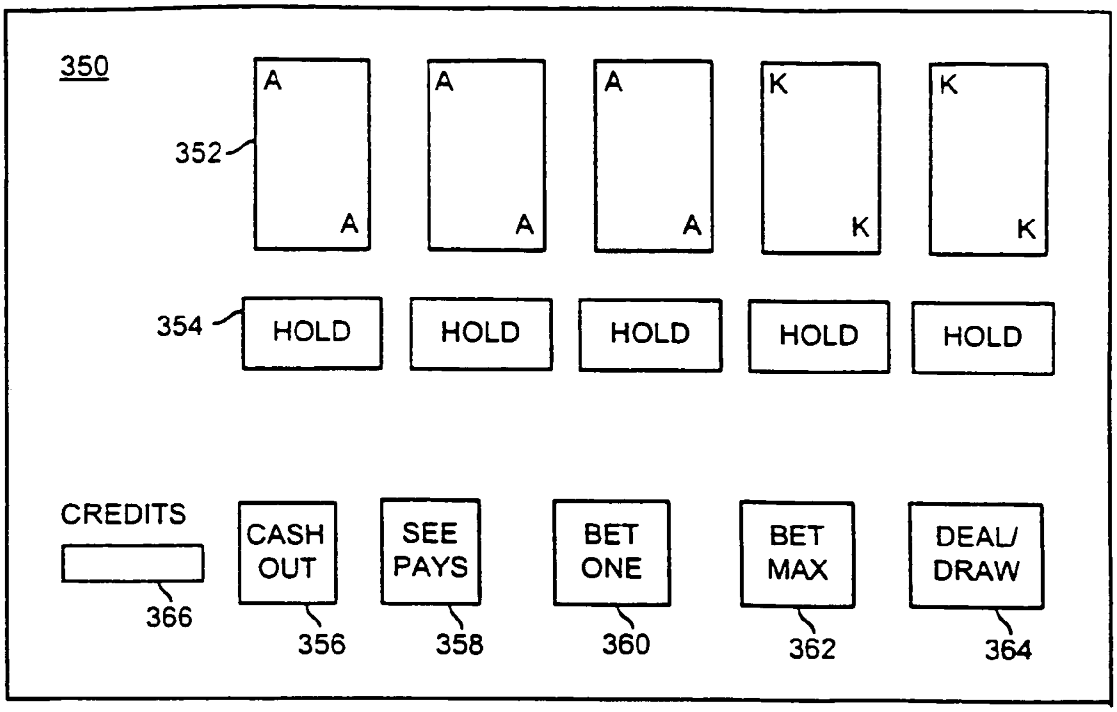
FIG. 7 is an illustration of an embodiment of a visual display that may be displayed during performance of the video poker routine of FIG. 9.

FIG. 7 is an exemplary display 350 that may be shown on. the display unit 70 during performance of the video poker routine 210 shown schematically in FIG. 4. Referring to FIG. 7, the display 350 may include video images 352 of a plurality of playing cards representing the player's hand, such as five cards. To allow the player to control the play of the video poker game, a plurality of player-selectable buttons may be displayed. The buttons may include a "Hold"button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 9:
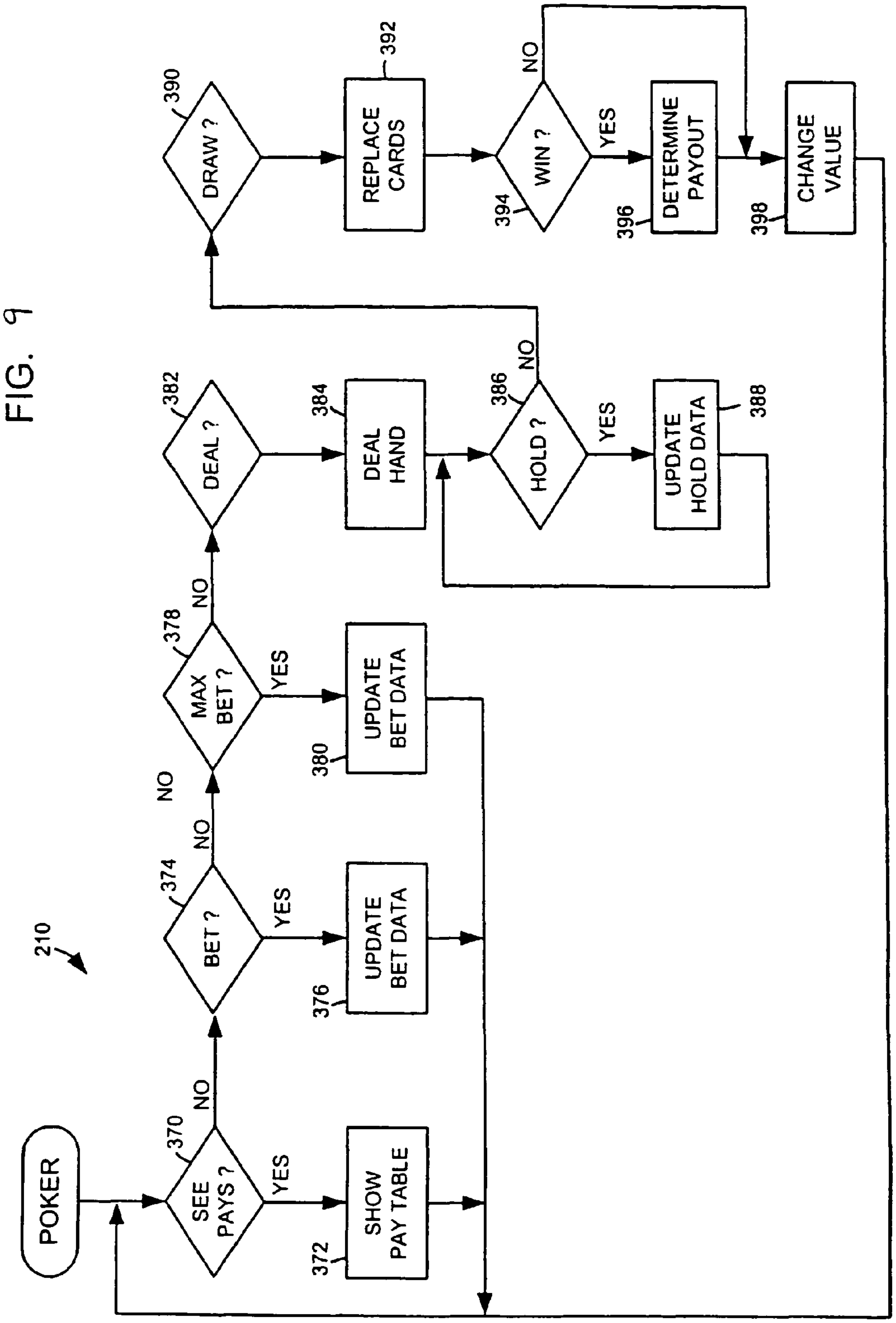
FIG. 9 is a flowchart of an embodiment of a video poker routine that may be performed by one or more of the gaming units.

FIG. 9 is a flowchart of the video poker routine 210 shown schematically in FIG. 4. Referring to FIG. 9, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 7).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 8:
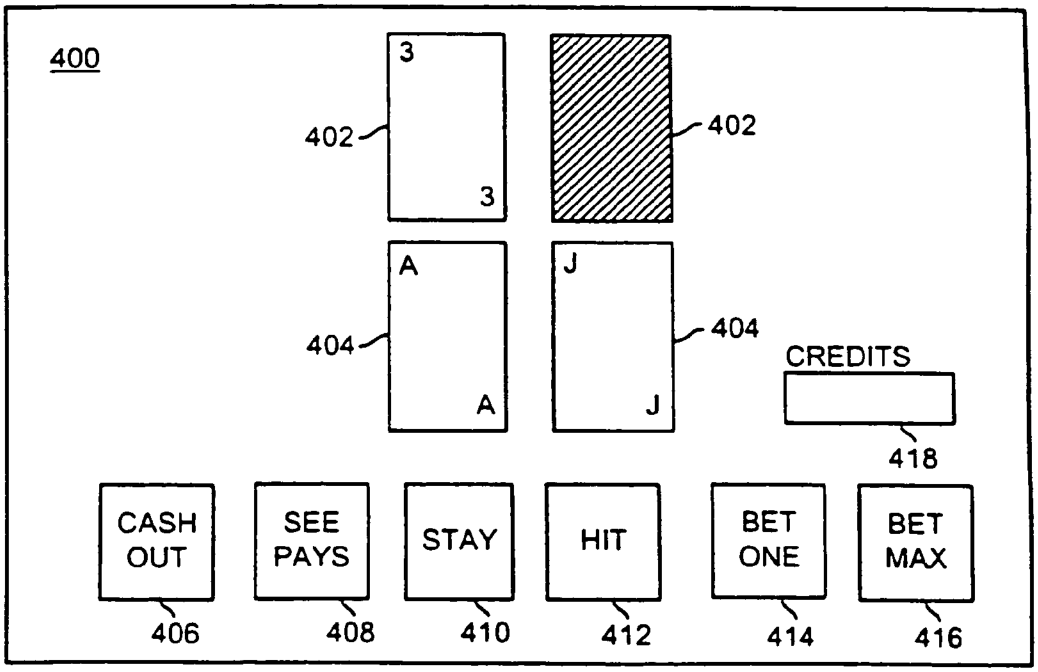
FIG. 8 is an illustration of an embodiment of a visual display that may be displayed during performance of the video blackjack routine of FIG. 10.

FIG. 8 is an exemplary display 400 that may be shown on the display unit 70 during performance of the video blackjack routine 220 shown schematically in FIG, 4. Referring to FIG. 8, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 10:
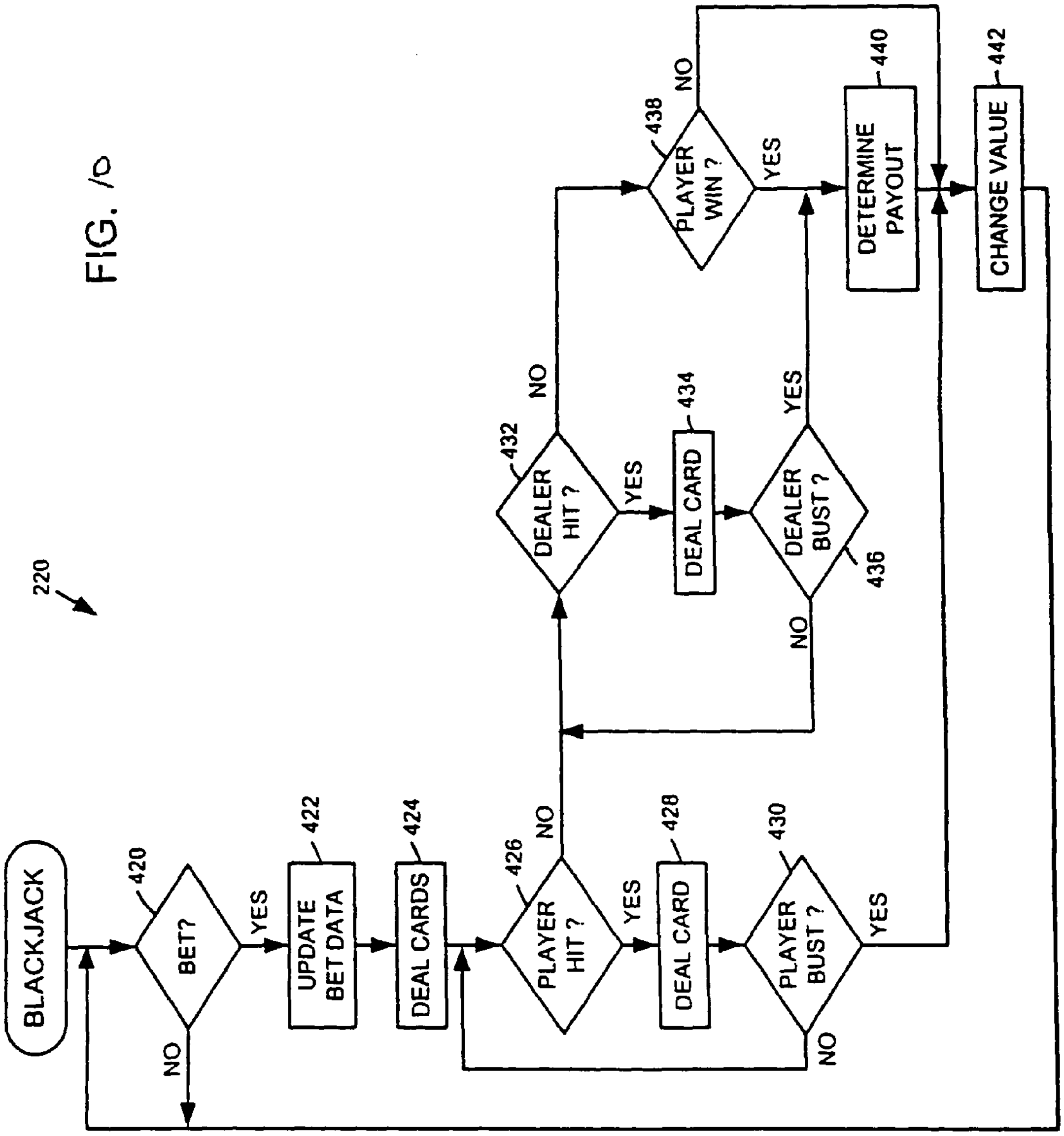
FIG. 10 is a flowchart of an embodiment of a video blackjack routine that may be performed by one or more of the gaming units.

FIG. 10 is a flowchart of the video blackjack routine 220 shown schematically in FIG. 4. Referring to FIG. 10, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21, If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 8).

Slots

FIG. 11 is an exemplary display 450 that may be shown on the display unit 70 during performance of the slots routine 230 shown schematically in FIG. 4. Referring to FIG. 11, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 13:
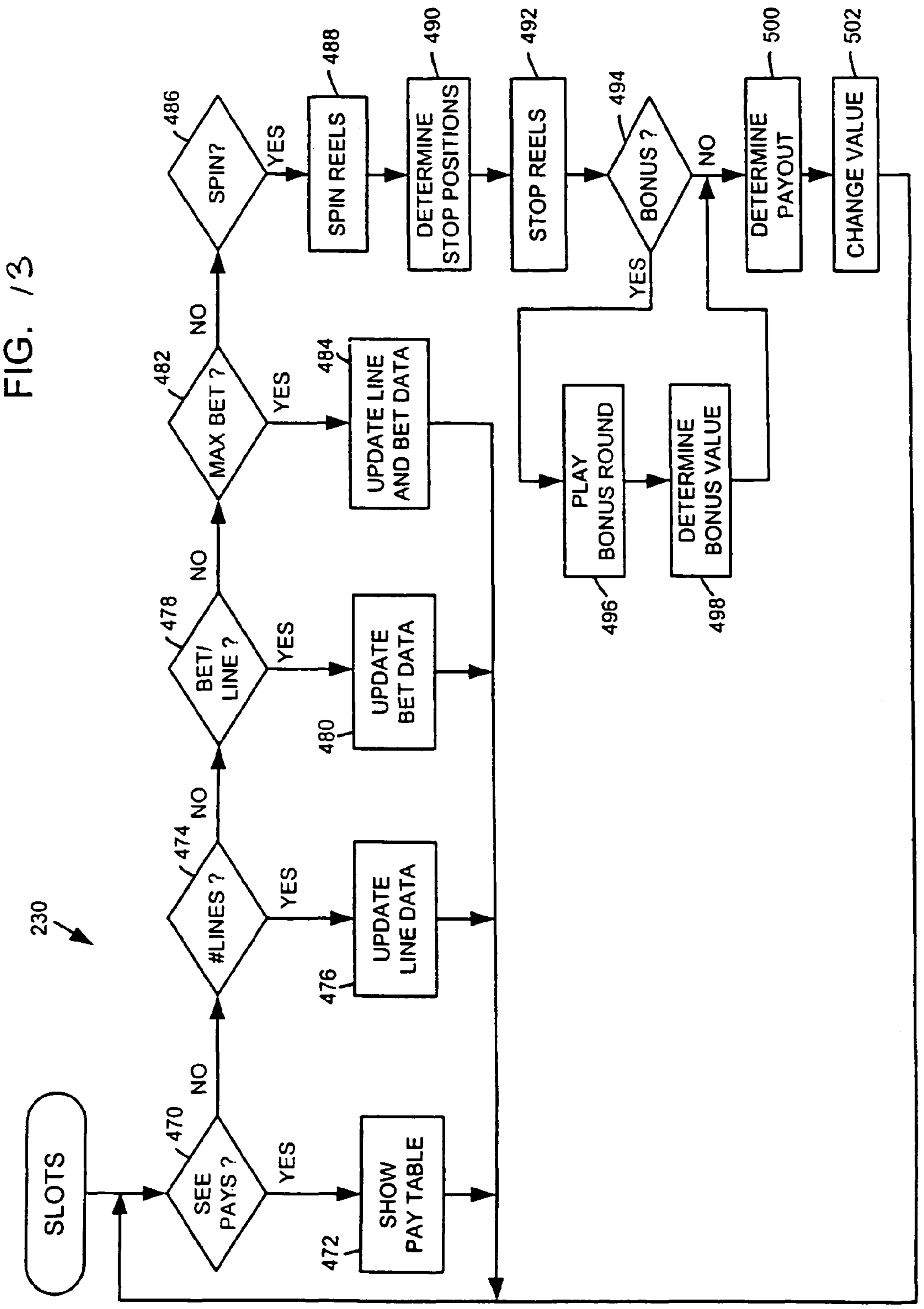
FIG. 13 is a flowchart of an embodiment of a slots routine that may be performed by one or more of the gaming units.

FIG. 13 is a flowchart of the slots routine 230 shown schematically in FIG. 11. Referring to FIG. 13, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 12 is an exemplary display 520 that may be shown on the display unit 70 during performance of the video keno routine 240 shown schematically in FIG. 4. Referring to FIG. 12, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 14:
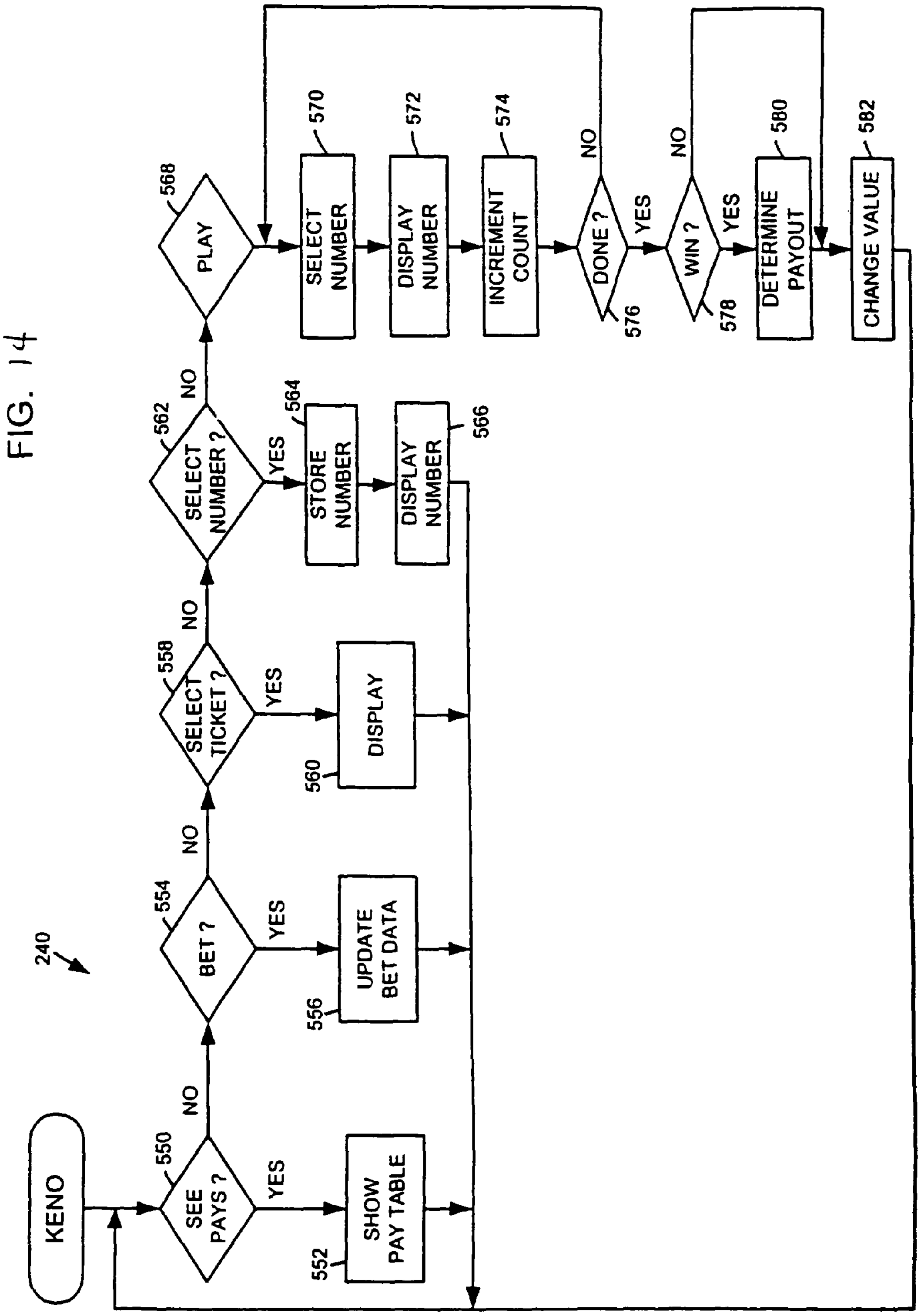
FIG. 14 is a flowchart of an embodiment of a video keno routine that may be performed by one or more of the gaming units.

FIG. 14 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 14, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 15:
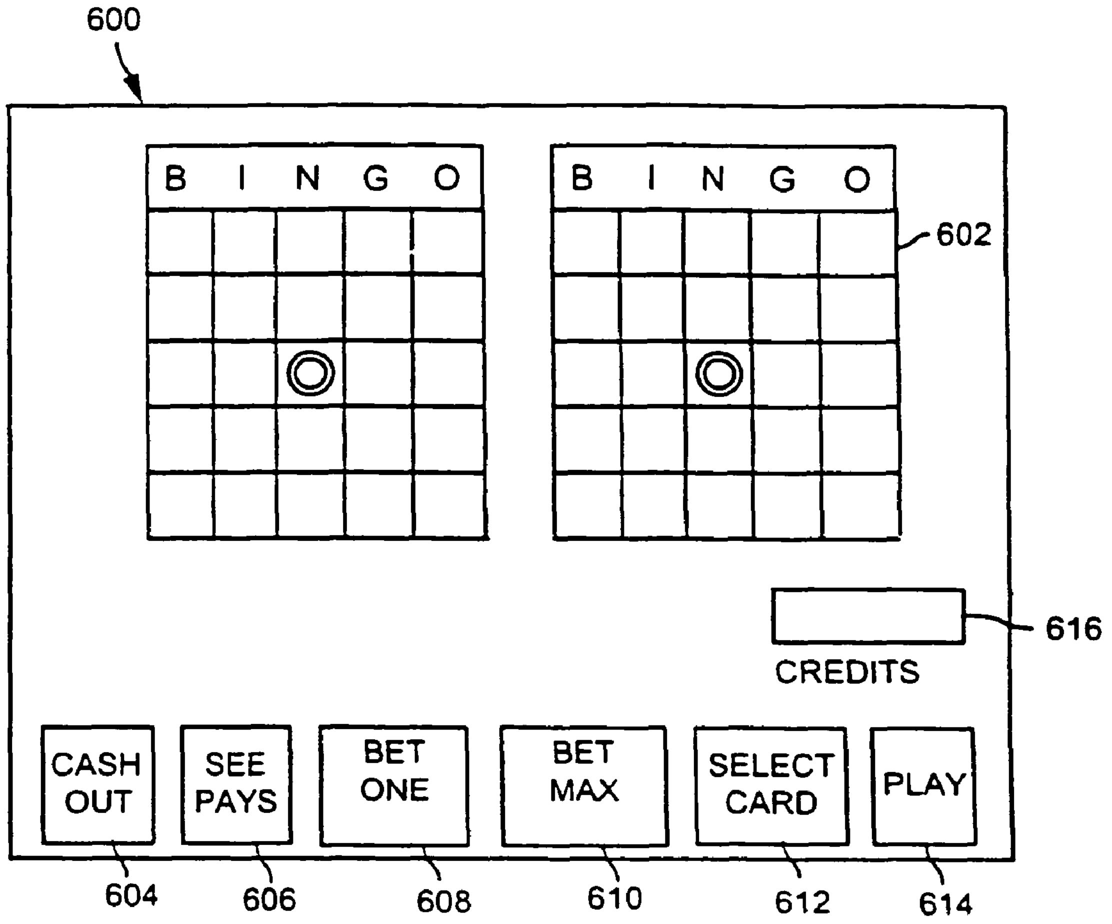
FIG. 15 is an illustration of an embodiment of a visual display that may be displayed during performance of the video bingo routine of FIG. 16.

FIG. 15 is an exemplary display 600 that may be shown on the display unit 70 during performance of the video bingo routine 250 shown schematically in FIG. 4. Referring to FIG. 15, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 16:
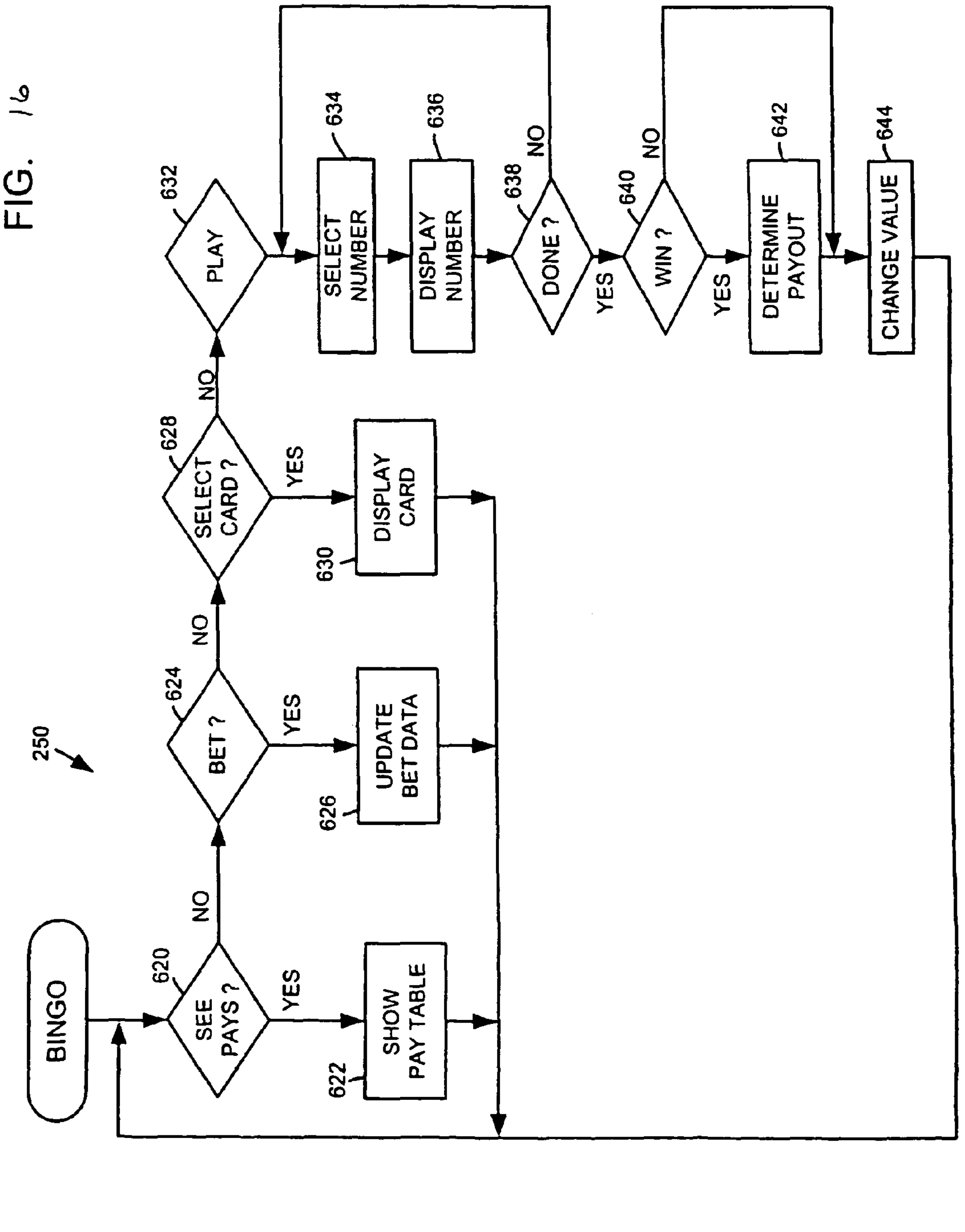
FIG. 16 is a flowchart of an embodiment of a video bingo routine that may be performed by one or more of the gaming units.

FIG. 16 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 16, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game, if no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 15).

What is claimed is:

1. A method of operating a gaming system comprising a plurality of gaming apparatuses in a gaming casino including one or more restaurants or theaters, said method comprising:

receiving position data relating to a position of a player, said data including coordinates within a frame of reference at any given time and over time wherein said frame of reference contains said gaming apparatuses and gaming casino, said position data not being generated by physical contact between the player and one of said gaming apparatuses;

retrieving stored player data that relates to the player;

displaying a first video image relating to a video game and determining a payout based on an outcome of the video game, the first video image and the payout not being based on the player data;

providing according to the position data a position record of the player's movement over time in the gaming casino and analyzing the position record to generate entertainment data for the player data for determining gaming and entertainment preferences of the player; and providing according to the position record a personalized operation based on the player data on a gaming apparatus in the gaming casino being operated by the player or on one or more unattended gaming apparatuses in the gaming casino within a predetermined range of the player's position in the gaming casino to attract the player to play on one such unattended gaming apparatus, the personalized operation selected from the group of personalized operations consisting of displaying a second video image relating to a video game, displaying a third video image unrelated to a video game, and providing a payout independent of the outcome of a video game.

2. The method of operating a gaming system according to claim 1, additionally comprising receiving position data relating to a position of a player from a wireless device carried by the player.

3. The method of operating a gaming system according to claim 1, additionally comprising determining a distance between the player and one of the gaming apparatuses based on the player position data.

4. The method of operating a gaming system according to claim 1, additionally comprising retrieving stored player personal data that relates to the player, the second video image differing from the first video image in that the second video image includes words in a language selected according to the stored player personal data.

5. The method of operating a gaming system according to claim 1, additionally comprising retrieving stored player gaming data that relates to gaming preferences of the player, the second video image differing from the first video image in that the second video image represents a favorite game based on the player gaming data, the favorite game selected from the group of games consisting of poker, blackjack, slots, keno and bingo.

6. The method of operating a gaming system according to claim 1, additionally comprising: retrieving stored player wagering data that relates to wagering preferences of the player; and selecting a wager amount based on the player wagering data without instruction from the player.

7. The method of operating a gaming system according to claim 1, additionally comprising retrieving stored player game piece data that relates to game piece preferences of the player, the second video image differing from the first video image in that the second video image includes a game piece image based on the player game piece data.

8. The method of operating a gaming system according to claim 1, additionally comprising retrieving stored player game environment data that relates to gaming preferences of the player, the second video image differing from the first video image in that the second video image includes a game environment based on the player game environment data.

9. The method of operating a gaming system according to claim 1, additionally comprising retrieving stored player personal data, the third video image representing a personalized video image based on the player personal data.

10. The method of operating a gaming system according to claim 9, wherein the personalized video image includes a greeting message incorporating a name included in the player personal data.

11. The method of operating a gaming system according to claim 9, wherein the personalized video image includes a congratulatory message incorporating a date selected from the group of dates consisting of a birthday, a wedding day and an anniversary.

12. The method of operating a gaming system according to claim 1, wherein the payout independent of the outcome of a video game includes a show ticket if the position data indicates that the player is proximate to a theater.

13. The method of operating a gaming system according to claim 1, wherein the payout independent of the outcome of a video game includes a restaurant voucher if the position data indicates that the player is proximate to a restaurant.

14. The method of operating a gaming system according to claim 1, wherein the payout independent of the outcome of a video game includes a coupon redeemable at one of the plurality of gaming apparatuses.

15. A method of operating a gaming system comprising a plurality of gaming apparatuses in a gaming casino including one or more restaurants or theaters, said method comprising:

receiving position data relating to a position of a player, said data including coordinates within a frame of reference at any given time and over time wherein said frame of reference contains said gaming apparatuses and gaming casino from a wireless device carried by the player;

retrieving stored player data that relates to the player;

displaying a first video image relating to a video game and determining a payout based on an outcome of the video game, the first video image and the payout not being based on the player data;

providing according to the position data a position record of the player's movement over time and analyzing the position record to generate entertainment data for the player data for determining gaming and entertainment preferences of the player; and providing according to the position record a personalized operation based on the player data on a gaming apparatus in the gaming casino being operated by the player or on one or more unattended gaming apparatuses in the gaming casino within a predetermined range of the player's position in the gaming casino to attract the player to play on one such unattended gaming apparatus, the personalized operation selected from the group of personalized operations consisting of displaying a second video image relating to a video game, displaying a third video image unrelated to a video game, and providing a payout independent of the outcome of a video game.

16. The method of operating a gaming system according to claim 15, additionally comprising retrieving stored player personal data that relates to the player, the second video image differing from the first video image in that the second video image includes words in a language selected according to the stored player personal data.

17. The method of operating a gaming system according to claim 15, additionally comprising retrieving stored player gaming data that relates to gaming preferences of the player, the second video image differing from the first video image in that the second video image represents a favorite game based on the player gaming data, the favorite game selected from the group of games consisting of poker, blackjack, slots, keno and bingo.

18. The method of operating a gaming system according to claim 15, additionally comprising retrieving stored player game piece data that relates to game piece preferences of the player, the second video image differing from the first video image in that the second video image includes a game piece image based on the player game piece data.

19. The method of operating a gaming system according to claim 15, additionally comprising retrieving stored player game environment data that relates to gaming preferences of the player, the second video image differing from the first video image in that the second video image includes a game environment based on the player game environment data.

20. The method of operating a gaming system according to claim 15, additionally comprising retrieving stored player personal data, the third video image representing a personalized video image based on the player personal data.

21. The method of operating a gaming system according to claim 20, wherein the personalized video image includes a greeting message incorporating a name included in the player personal data.

22. The method of operating a gaming system according to claim 20, wherein the personalized video image includes a congratulatory message incorporating a date selected from the group of dates consisting of a birthday, a wedding day and an anniversary.

23. The method of operating a gaming system according to claim 15, wherein the payout independent of the outcome of a video game includes a show ticket if the position data indicates that the player is proximate to a theater.

24. The method of operating a gaming system according to claim 15, wherein the payout independent of the outcome of a video game includes a restaurant voucher if the position data indicates that the player is proximate to a restaurant.

25. The method of operating a gaming system according to claim 15, wherein the payout independent of the outcome of a video game includes a coupon redeemable at one of the plurality of gaming apparatuses.

26. A gaming system comprising:

a gaming apparatus in a gaming casino including one or more restaurants or theaters, said apparatus including a video display unit and a payout device;

a wireless personal tracking system adapted to determine a position of a player in the gaming casino; and a computer operatively coupled to the gaming apparatus and the wireless personal tracking system, the computer comprising a processor and a memory operatively coupled to the processor, the computer being programmed to receive position data relating to the position of the player, said data including coordinates within a frame of reference at any given time and over time wherein said frame of reference contains said gaming casino, said position data not being generated by physical contact between the player and the gaming apparatus;

the computer being programmed to provide according to the position data a position record of the player's movement over time in the gaming casino and to analyze the position record to generate entertainment data for the player data for determining gaming and entertainment preferences of the player;

the computer being programmed to retrieve stored player data that relates to the player; the computer programmed to cause the display unit to generate a first video image relating to a video game and to determine a payout based on an outcome of the video game, the first video image and the payout not being based on the player data; and the computer being programmed to cause the display unit and the payout device to provide according to the position record a personalized operation based on the player data on a gaming apparatus in the gaming casino being operated by the player or on one or more unattended gaming apparatuses in the gaming casino within a predetermined range of the player's position in the gaming casino to attract the player to play on one such unattended gaming apparatus, the personalized operation selected from the group of personalized operations consisting of displaying a second video image relating to a video game, displaying a third video image unrelated to a video game, and providing a payout independent of the outcome of a video game.

27. The gaming system according to claim 26, wherein the computer is programmed to receive position data relating to a position of a player from a wireless device carried by the player.

28. The gaming system according to claim 26, wherein the computer is programmed to retrieve stored player personal data that relates to the player, the second video image differing from the first video image in that the second video image includes words in a language selected according to the stored player personal data.

29. The gaming system according to claim 26, wherein the computer is programmed to retrieve stored player gaming data that relates to gaming preferences of the player, the second video image differing from the first video image in that the second video image represents a favorite game based on the player gaming data, the favorite game selected from the group of games consisting of poker, blackjack, slots, keno and bingo.

30. The gaming system according to claim 26, wherein the computer is programmed to retrieve stored player game piece data that relates to game piece preferences of the player, the second video image differing from the first video image in that the second video image includes a game piece image based on the player game piece data.

31. The gaming system according to claim 26, wherein the computer is programmed to retrieve stored player game environment data that relates to gaming preferences of the player, the second video image differing from the first video image in that the second video image includes a game environment based on the player game environment data.

32. The gaming system according to claim 26, wherein the computer is programmed to retrieve stored player personal data, the third video image representing a personalized video image based on the player personal data.

33. The gaming system according to claim 32, wherein the personalized video image includes a greeting message incorporating a name included in the player personal data.

34. The gaming system according to claim 32, wherein the personalized video image includes a congratulatory message incorporating a date selected from the group of dates consisting of a birthday, a wedding day and an anniversary.

35. The gaming system according to claim 26, wherein the payout independent of the outcome of a video game includes a show ticket if the position data indicates that the player is proximate to a theater.

36. The gaming system according to claim 26, wherein the payout independent of the outcome of a video game includes a restaurant voucher if the position data indicates that the player is proximate to a restaurant.

37. The gaming system according to claim 26, wherein the payout independent of the outcome of a video game includes a coupon redeemable at another gaming apparatus.

38. A gaming apparatus comprising:

a display unit that is capable of generating video images;

a value input device; a controller operatively coupled to said display unit and said value input device, said controller comprising a processor and a memory operatively coupled to said processor, the controller being programmed to receive position data relating to the position of a player, said data including coordinates within a frame of reference at any given time and over time wherein said frame of reference contains said apparatus, additional gaming apparatuses, and one or more restaurants or theaters, said position data not being generated by physical contact between the player and the gaming apparatus;

the controller being programmed to provide according to the position data a position record of the player's movement over time in the gaming casino and to analyze the position record regarding movement of the player to and near gaming apparatuses within the frame of reference to generate entertainment data for the player data for determining gaming and entertainment preferences of the player;

the controller being programmed to retrieve stored player data that relates to the player; the controller programmed to cause the display unit to generate a first video image relating to a video game and to determine a payout based on an outcome of the video game, the first video image and the payout not being based on the player data; and the controller programmed to cause the display unit and the payout device to provide according to the position record a personalized operation based on the player data on a gaming apparatus in the frame of reference being operated by the player or on one or more unattended gaming apparatuses in the frame of reference within a predetermined range of the player's position in the frame of reference to attract the player to play on one such unattended gaming apparatus, the personalized operation selected from the group of personalized operations consisting of displaying a second video image relating to a video game, displaying a third video image unrelated to a video game, and providing a payout independent of the outcome of a video game.

39. The gaming apparatus according to claim 38, wherein the controller is programmed to receive position data relating to a position of a player from a wireless device carried by the player.

40. The gaming apparatus according to claim 38, wherein the controller is programmed to retrieve stored player personal data that relates to the player, the second video image differing from the first video image in that the second video image includes words in a language selected according to the stored player personal data.

41. The gaming apparatus according to claim 38, wherein the controller is programmed to retrieve stored player gaming data that relates to gaming preferences of the player, the second video image differing from the first video image in that the second video image represents a favorite game based on the player gaming data, the favorite game selected from the group of games consisting of poker, blackjack, slots, keno and bingo.

42. The gaming apparatus according to claim 38, wherein the controller is programmed to retrieve stored player game piece data that relates to game piece preferences of the player, the second video image differing from the first video image in that the second video image includes a game piece image based on the player game piece data.

43. The gaming apparatus according to claim 38, wherein the controller is programmed to retrieve stored player game environment data that relates to gaming preferences of the player, the second video image differing from the first video image in that the second video image includes a game environment based 6*n* the player game environment data.

44. The gaming apparatus according to claim 38, wherein the controller is programmed to retrieve stored player personal data, the third video image representing a personalized video image based on the player personal data.

45. The gaming apparatus according to claim 44, wherein the personalized video image includes a greeting message incorporating a name included in the player personal data.

46. The gaming apparatus according to claim 44, wherein the personalized video image includes a congratulatory message incorporating a date selected from the group of dates consisting of a birthday, a wedding day and an anniversary.

47. The gaming apparatus according to claim 38, wherein the payout independent of the outcome of a video game includes a show ticket if the position data indicates that the player is proximate to a theater.

48. The gaming apparatus according to claim 38, wherein the payout independent of the outcome of a video game includes a restaurant voucher if the position data indicates that the player is proximate to a restaurant.

49. The gaming apparatus according to claim 38, wherein the payout independent of the outcome of a video game includes a coupon redeemable at another gaming apparatus.

* * * * *